Jan. 13, 1970   B. L. BAILEY   3,489,984
ELECTRICAL CONNECTION BETWEEN ELECTRICAL CONDUCTORS SUCH
AS BETWEEN A METAL BAR AND A CATHODE OF AN ALUMINUM CELL
Filed Dec. 27, 1966   4 Sheets-Sheet 1
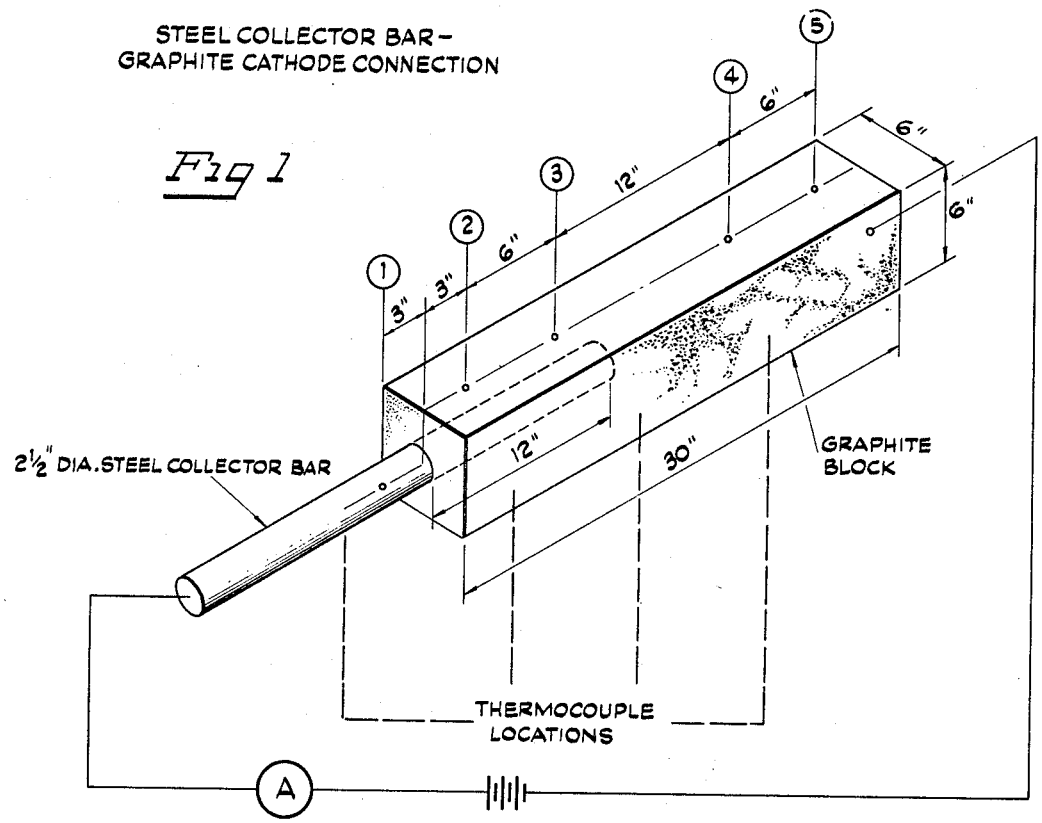
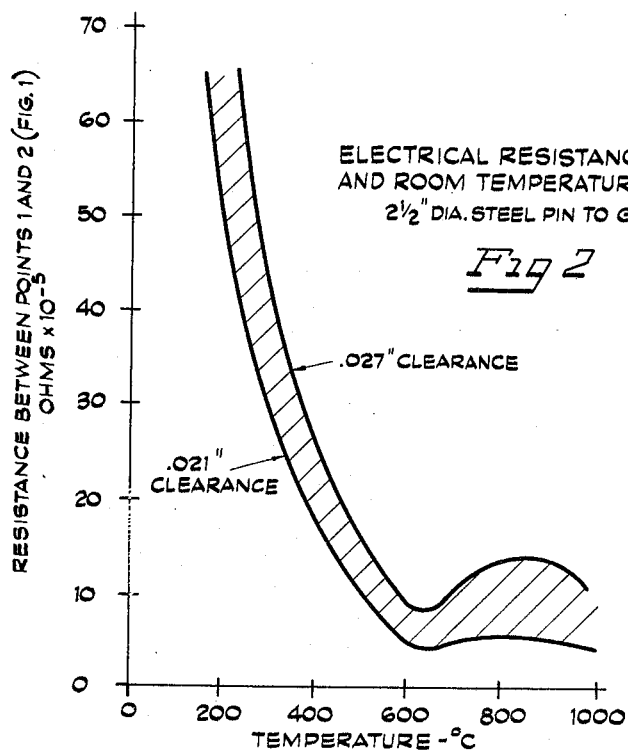
INVENTOR
BRUCE L. BAILEY Jan. 13, 1970  B. L. BAILEY  3,489,984
ELECTRICAL CONNECTION BETWEEN ELECTRICAL CONDUCTORS SUCH
AS BETWEEN A METAL BAR AND A CATHODE OF AN ALUMINUM CELL
Filed Dec. 27, 1966  4 Sheets-Sheet 2
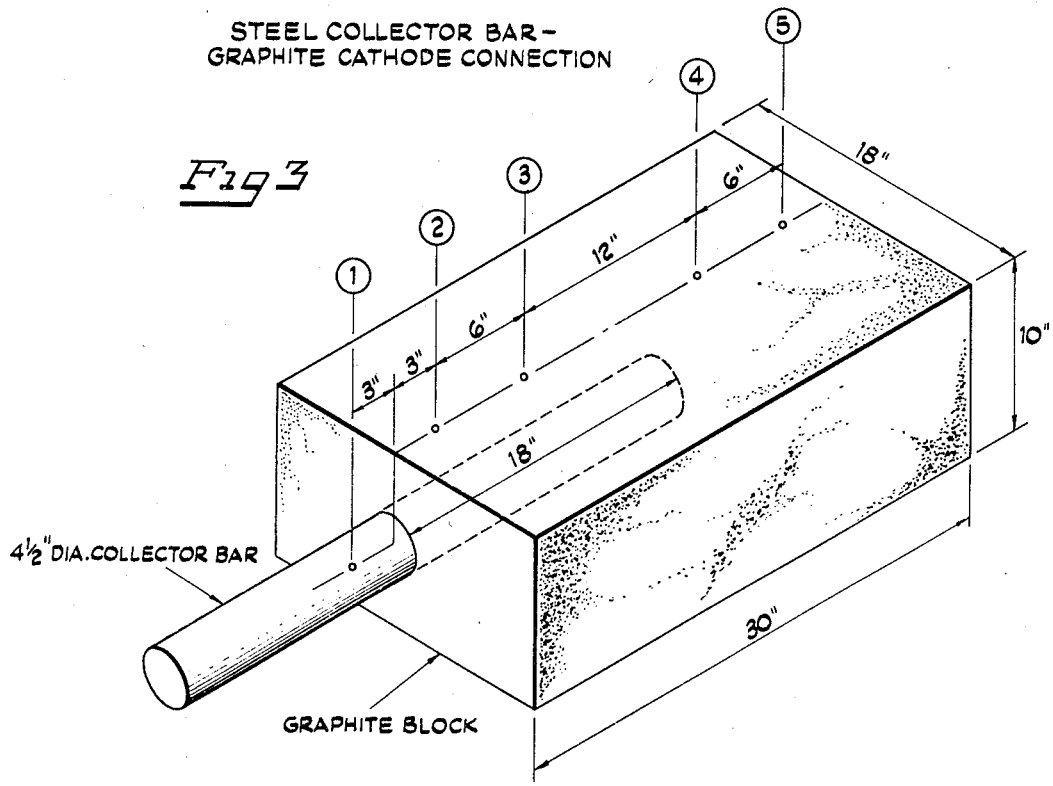
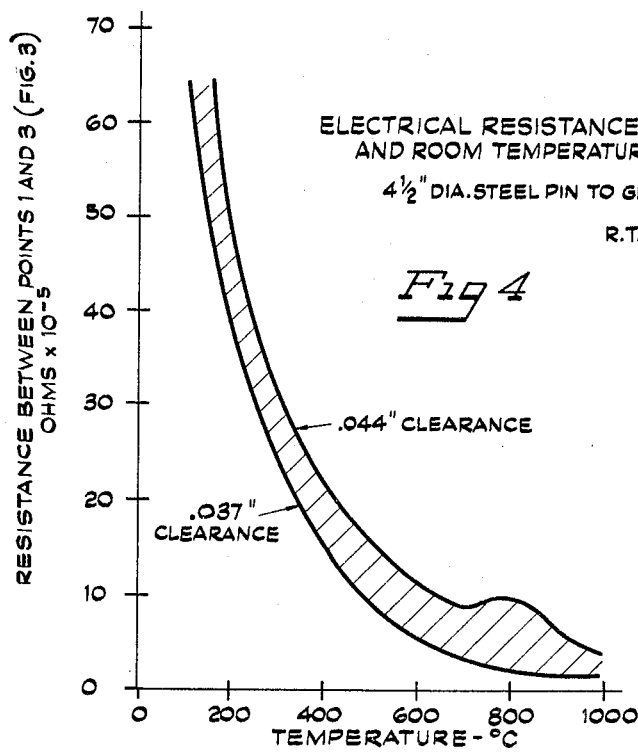
INVENTOR
BRUCE L. BAILEY

EXPERIMENTAL ARRANGEMENT TO SIMULATE ALUMINUM CELL START-UP

ELECTRICAL RESISTANCE VS. TEMPERATURE FOR SIMULATED ALUMINUM CELL START-UP ARRANGEMENT

4½" DIA. STEEL PIN TO GRAPHITE
R.T. CLEARANCE -.040"

INVENTOR
BRUCE L. BAILEY

LONGITUDINAL
GRAPHITE
STEEL BAR
TRANSVERSE

INVENTOR
BRUCE L. BAILEY

United States Patent Office 3,489,984
Patented Jan. 13, 1970

3,489,984
ELECTRICAL CONNECTION BETWEEN ELECTRICAL CONDUCTORS SUCH AS BETWEEN A METAL BAR AND A CATHODE OF AN ALUMINUM CELL
Bruce L. Bailey, Lewiston, N.Y., assignor to Great Lakes Carbon Corporation, New York, N.Y., a corporation of Delaware
Filed Dec. 27, 1966, Ser. No. 611,207
Int. Cl. H01r *13/20;* E04b *1/48;* H02g *15/08*
U.S. Cl. 339—30         22 Claims

ABSTRACT OF THE DISCLOSURE

An electrical connection is made between two electrical conductors having different coefficients of thermal expansion between the two conductors. More particularly when in use to a temperature different than that at which it is assembled so as to cause a differential expansion between the two conductors. More particularly, the invention relates to such a connection wherein the connection between the two conductors is made by a recess in one of the conductors into which a portion of the other conductor fits with a predetermined clearance at assembly temperature, said predetermined clearance allowing for the differential expansion between the inserted conductor and the other conductor as the temperature of the connection is changed to the temperature at which it will be used. This "predetermined" clearance is small enough that as the temperature of the connection is changed from the assembly temperature to its use temperature the two conductors are brought into forceful contact with each other, but is not so small that the strain set up in either member by the differential expansion will cause some phenomena to occur which will result in an appreciable rise in the electrical resistance of the connection. More is said in the following specification regarding the afore-briefly described features of the connection so that their meaning will become clearer.

---

Figure 5:
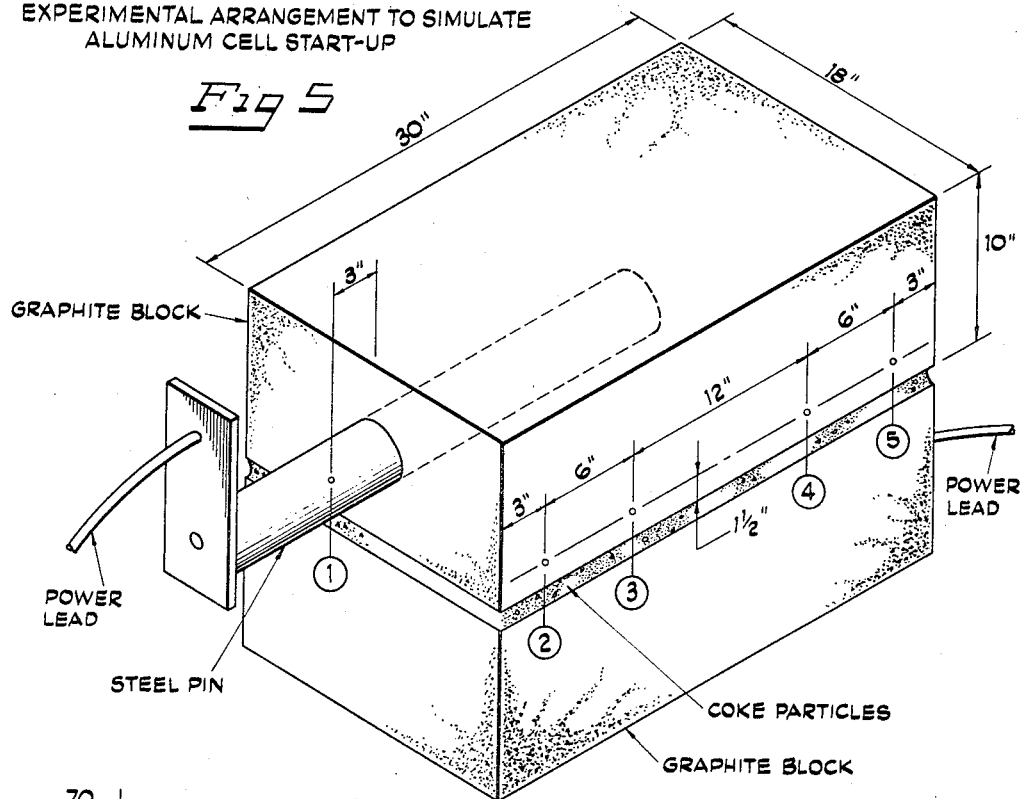

This invention relates most particularly to the electrical connection between a metal bar such as steel and a carbon article wherein the electrical connection will be subjected to elevated temperatures when in use, such as in the electrical connection to the cathode of an aluminum cell or aluminum reduction pot. The connection depends for its operability upon the differential expansion between these two materials as they are heated to an elevated temperature, The invention also relates to a multiplicity of such connections between metal collector bars and the cathode of an aluminum cell.

Electrical connections between metal collector bars and the cathode in an aluminum cell have been made by many different methods none of which have been very satisfactory in the past. This was due to the fact that the connections were complex and involved considerable machining and many operations in their assemblage, or was because the voltage drops across said connections were too high during the operation of the cell, or for other reasons.

It is an object of the present invention to provide improved connection(s) between metal collector bars and the cathode in an aluminum cell. It is another object of this invention to provide such connections which permit fast and inexpensive assembly of an aluminum cell pot lining, minimize expensive machining, use relatively inexpensive mild steel for the collector bars, and also provide such connections which give good electrical contact between the steel collector bars and the cathode, thus effecting a low voltage drop for such connection(s) and a low overall voltage drop for all of the connections or for the entire cell during its operation.

It is yet another object to provide electrical connections having the characteristics and which utilize principles of operation described herein, and to us such connections in environments other than aluminum cells.

These objects are attained by an improved connection (or series of such connections) consisting of an electrical conductor such as a mild steel (such as SAE-AISI trade designation 1020) pin which fits into a recess or hole in the end of the other conductor, such as a cathode block. The recess or hole in the other conductor or cathode block is machined larger than the male conductor or steel pin by a predetermined and controlled amount. Typically and preferably this recess is cylindrical and the male conductor or steel pin is also cylindrical. The difference in size or diameter which defines this predetermined clearance permits a very easy assembly of the connection(s) to the cathode because of the initial clearance between the steel pin(s) and the recess(es) in the cathode. This clearance also allows for the differential expansion between male and female electrical conductors or between the steel pins and the cathode as the pot is heated from room temperature to operating temperature. The operating temperature of the cell is typically about 950° C. The predetermined clearance is such that it is small enough that as the temperature of the connection(s) approaches the operating temperature of the cell the two conductors are brought into forceful contact with each other; but the clearance is not so small that the strain set up in the carbon member by the differential expansion, viz the greater expansion of the male conductor (steel) than of the female conductor (cathode) will cause the carbon member to split or otherwise result in an appreciable rise in the electrical resistance of the connection. Such "splitting," if severe enough, would destroy the forceful contact between the members of the connection and thus substantially or appreciably increase the electrical resistance of the connection.

At the operating or "use" temperature, the electrical contact or connection between the male and female conductors or between the steel pin and the cathode block is good and as a result there is a minimum voltage drop or loss between the pin and the cathode at any particular connection, and minimum overall voltage drop for the totality of such connections in the cell.

The following described tests demonstrate the feasibility and effectiveness of the connection(s) of this invention. In these tests, a number of steel-to-graphite collector bar connections were made, utilizing straight cylindrical steel pin(s) with straight cylindrical recess(es) machined into graphite. The components were prepared to provide a clearance between the steel and graphite at room temperature. This clearance was such that at the operating temperature of an aluminium pot (900–950° C.) forceful contact was established sufficient to provide good electrical contact between the steel and graphite and at the same time not split the graphite. The tests demonstrated that connections of this type will work very satisfactorily in an aluminium cell application. (As previously pointed out, connections of the type described in the tests may be used elsewhere, and at different temperatures, than in aluminum cells, and using electrical conductors made from materials other than steel and graphite.)

In these tests, a range of room temperature clearances were tested using mild steel pins of 2½" (inches) and 4½" nominal diameter. Preferred minimum and maximum clearances for each of these pins were also determined. These tests were designed to determine, first, the electrical characteristics and second, the mechanical compatability of the connection. For this purpose the assembled components were tested in a furnace; D.C. current leads were connected to the assembly at the end of the steel bar and at the back end of the graphite block. Potential leads and thermocouples were placed at regular intervals along the length of the assembly. The resistance was determined by the volt meter-ammeter method. These measurements were made as the assembly was heated from room temperature to 1000° C. Voltage readings were taken with the current passing in both directions in order to correct for thermal EMF's.

The accompanying drawings illustrate and help to describe the invention. FIGURE 1 shows schematically the testing and measuring arrangement described above and employed in carrying out most of the tests of the present invention. It also shows the physical dimensions and the potential lead (1, 2, 3, 4, and 5) placement for the tests on the 2½" diameter mild steel pin or bar. In this case, the bar penetrates 12" into the 6" x 6" cross section of graphite. (Only a portion of the length of the steel metal bar fits or is inserted into the graphite since one end of the metal bar must be free for coupling to the power supply, just as in the aluminum cell collector bar connection.)

In FIGURE 2 the resistance between potential leads 1 and 2 of FIG. 1, i.e., a six-inch span from 3" on the steel rod outside of the graphite to 3" along the length of the graphite, is plotted as a function of temperature for assemblies having a room temperature clearance ranging between .021" and .027". This range of clearances was found to be very satisfactory for the size pin indicated and sufficient to allow for machining tolerances and to result in a resistance between about $5 \times 10^{-5}$ and about $14 \times 10^{-5}$ ohms at 900° C., without any danger of cracking the graphite (which, if it were to occur, could result in an appreciable rise in the electrical resistance of the connection due to a lowering of the contact force between the members). Such resistances (and consequently, such clearances) are considered practical and very advantageous for a cell installation. Clearances outside the foregoing .021–.027" range for a 2½" pin were also tested before this operative and very satisfactory range was found. It was found that clearances between about .015" and about .033" were generally operative. It should be appreciated that the magnitude of the clearance which might be used is a function of the physical properties of the graphite such as its CTE, density and strength and dimensions, etc. Clearances less than .015" will typically split the graphite, and clearances higher than about .033" typically result in impractically high resistances (not due to graphite splitting, but due to insufficient forceful contact being developed between the steel pin and the graphite). The foregoing room temperature clearances between .015" and .033" correspond to between about 0.6% and about 1.3% of the nominal diameter of the steel bar which mathematical relationship or clearances are representative of those which may be used in the present invention whenever the connections are made by using cylindrical steel pins with graphite. "Nominal diameter" refers to the diameter or size under which the steel bar is listed in handbooks or catalogues for such stock items as cold roll steel bars or centerless ground steel bars.

The physical dimensions of components and potential lead placement for tests of a 4½" diameter pin pentrating 18" into graphite are shown in FIGURE 3. The same test procedure used for the smaller pin was followed except that point 3 was used instead of point 2 in measuring the resistance. The data from the tests on assemblies having clearances ranging from .037" to .044" (which clearances were found to be operative and also very satisfactory for an aluminum cell application for the size pin indicated) are preseneted in FIGURE 4. These clearances on the 4½" diameter pin result in a resistance range at 900° C. from about $2 \times 10^{-5}$ to about $6 \times 10^{-5}$ ohms. Additional tests indicated that clearances less than about .027" may result in splitting the graphite while clearances larger than about .059" result in undesirably high joint resistances and voltage drops due to insufficient forceful contact being developed between the steel pin and the graphite. These clearances are about 0.6% to about 1.3% of the nominal diameter of the steel bar.

It will be noted that FIGURES 2 and 4 also both illustrate the variation of resistance with the temperature of the connection and that the curves have the same general form regardless of the diameter of the steel pin. The steel to carbon or graphite article connections of the present invention are considered most useful at elevated temperatures between about 400° C. and about 1050° C.

Figure 6:
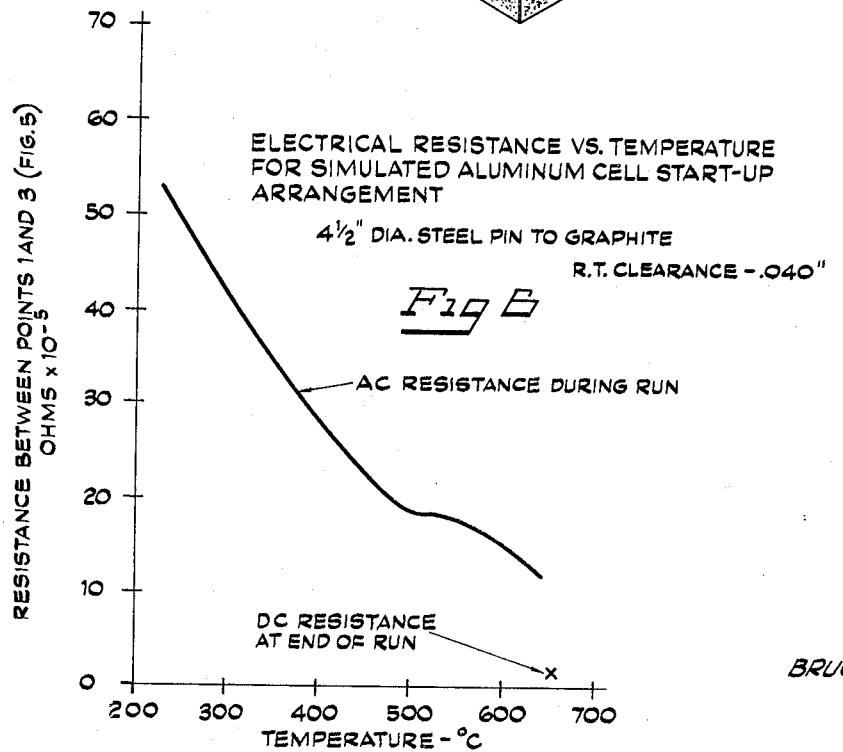

The room temperature resistances of the experimental joints were measured and were found to be between 600 and $1000 \times 10^{-5}$ ohms for the 2½" diameter pin and between 300 and $450 \times 10^{-5}$ ohms for the 4½" diameter pin. Such relatively high resistance values suggested that there might be serious problems in getting sufficient power into an aluminum cell to bring it up to operating temperatures. In order to determine the problems which might be encountered in starting up an aluminum cell, a simulated aluminum cell set-up was made as shown in FIGURE 5, employing a 4½" diameter steel pin with .040" clearance. wherein the joint was heated by its own resistance. An A.C. transformer capable of supplying 3000 amperes of current to the set-up employed for the power supply. A potential of 3 volts A.C. applied to the power leads raised the temperature to 200° C. in 15 minutes as the current rose to 3000 amperes. The current was then held at 3000 amperes and voltage drops and temperatures were recorded periodically. A D.C. resistance measurement was made at the conclusion of the run. The data from this test-run are shown in FIGURE 6. A temperature of 650° C. was reached in 7 hours at which time the resistance had reached a level comparable with those found in the previous tests and beyond which no problems are anticipated in operation. Inspection of the pin after the heating tests showed no indication of arcing or melting. As indicated on FIGURE 6, after reaching 650° C., the A.C. power was disconnected and a D.C. resistance determination quickly made. At this temperature the indicated A.C. resistance was about $12 \times 10^{-5}$ ohms while the D.C. resistance was about $1.5 \times 10^{-5}$ ohms. The difference between these two determinations is due to inductive drop in the A.C. circuit, the D.C. value being applicable to the aluminum cell because of the fact that such cells typically use a D.C. power supply. This test demonstrated that there would be little or no problem in starting an aluminum cell with the straight collector bars by a normal start-up procedure.

The foregoing type start-up and set-up such as illustrated in FIGURE 5 is believed to closely simulate or substantially duplicate the start-up of an aluminum pot. For example, a typical procedure in starting an aluminum cell is to spread a layer of coke on top of the cathode, bring the anode down to contact and "short" it to the coke and then pass power through the cell. (The top graphite block in FIG. 5, therefore, simulates the anode of an aluminum cell.) It then normally requires 72 to 96 hours for the pot to reach a temperature of 600–700° C. The coke is then removed, hot metal and electrolyte added, and the pot put in the line. Similar conditions are considered present in the foregoing described simulated start-up arrangement as described and as illustrated in FIG. 5.

Assemblies in accordance with the teachings of the present invention were made in several other ways. In one embodiment a rectangular graphite block which was 5¾" high, 23¼" wide and 90" long was used as the graphite article. This block had six straight cylindrical holes or recesses which went into the block 23", three holes from each end of the block. The holes were machined for the insertion of six 2½" diameter cylindrical steel bars, each with a clearance of .029"∓.002". The holes were drilled in the graphite blocks approximately midway between the top and bottom surface, in a manner such as illustrated in FIG. 1. The three 2½" holes in each end were also drilled on centers which were 7¾ inches apart, the center of the first hole being 3⅞ inches from the side of the block. The six connections were electrically heated in a manner as previously described to a temperature of 950° C, the approximate operating temperature of an aluminum pot. The total current into the graphite block was about 7200 amperes carried by the six 2½" pins, or about 7 amperes per square inch of pin surface contact area. The connections were very easily made, were each of low voltage drop and were mechanically strong at the operating temperature but there was no splitting of the graphite. The arrangement was such that it simulated very closely a commercial aluminum pot installation except that the commercial pot would employ eight such blocks side by side with twenty four similiary placed collector bars at each end of the pot for the cathode.

Assemblages were made in which 4½" cylindrical pins were coupled into recesses 12" deep in opposite ends of graphite blocks about 8 feet long, in contrast to the single 18" deep recess and 2½ foot graphite block length illustrated in FIG. 4. The clearance used for each of these connections was .040". The blocks were 18 inches wide, 9 inches thick, and 1 pin was used in each end. The holes in each end were drilled on centers (viz 9 inches from the side and 4½ inches from the top). These connections also simulated a commercial aluminum cell pot construction and the operability and advantages of the connections were again demonstrated in these tests.

As has been indicated, the length of the contracts between the pins and the recesses or holes, may be varied depending on the amount of current required and the specific operating conditions but generally will be kept between about 6" and about 36" for pins varying in size between about 2 inches and about 6 inches in diameter in order to insure adequate mechanical contact.

The recess into which the steel metal bar is inserted may also be enlarged, if desired, near the entry surface of the graphite in order to further facilitate the making of the connection. The effect of this is to direct the current farther into the cathode and to reduce or eliminate the current near the outer edges of the cathode. This is desirable from the standpoint of cell operation.

Thus far the recesses and steel pins or bars described and illustrated have been of a cylindrical nature in which the recess is in the form of a cylindrical socket which extends inwardly from a single surface of the female conductor or graphite article. (As used herein, "graphite" connotes a formed carbon article heated to 2600° C. or higher. The term "carbon article" is intended to be generic to pre-bake, baked, amorphous, semi-graphite and graphite articles as these terms are generally understood in the art, unless the article is stated specifically to be graphite and/or some other specific type of carbon.) Instead of the recess or socket being cylindrical and circular in cross-section, it may also have another shape such as square or rectangular or trapezoidal in cross-section, with the male conductor or steel metal bar of a corresponding shape but of slightly reduced dimension to provide for the predetermined clearance. Also, instead of a recess in the form of an enclosed socket which extends inwardly from a single surface of the female conductor or graphite article, the recess may be made so that it extends all the way or entirely through the female conductor or graphite article.

Figure 7A:
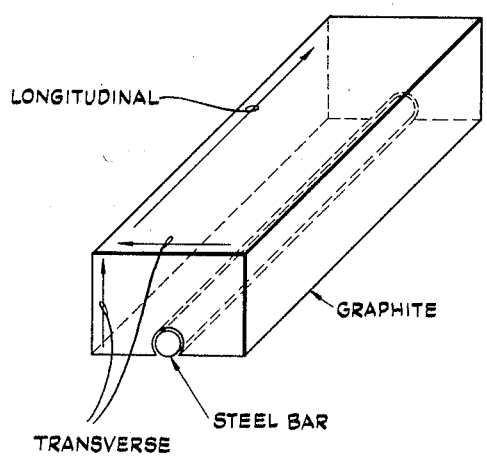
Figure 7C:
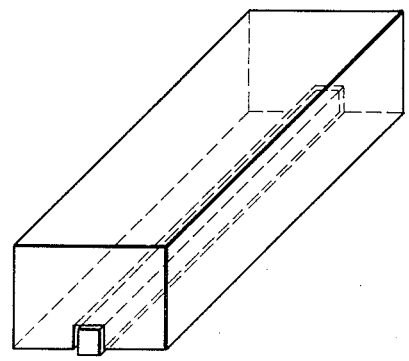
Figure 7B:
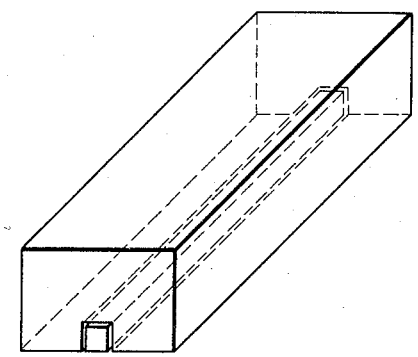
Figure 7D:
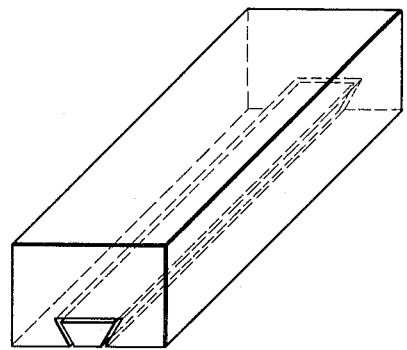

It may sometimes also be desirable to make the socket or recess in a manner such as illustrated in FIGURES 7a–7d wherein in each case the recess extends from one end of the female conductor or graphite article and also cleaves a second (typically bottom) surface of the conductor or graphite article. This recess which cleaves a second surface may extend entirely through the conductor or graphite article from one end to the opposite end or it may terminate short of the opposite end. The recess and cleavage may also, as just discussed, be in the form of a cylindrical hole as in FIG. 7a, or have a non-circular cross-section such as square as in FIG. 7b, or rectangular as illustrated in FIG. 7c, or trapezoidal as in FIG. 7d. In any case it is necessary that the cross-sectional shapes of the recess and of the electrical conductor be matched in some suitable fashion such that there will be a forceful contact or engagement between the two conductors at the temperature at which the connection is to be used. Typically this means that the conductor and recess will have substantially the same cross-sectional shape, so that the clearance is uniform around or on all sides of the conductor. However, the foregoing condition is not essential and there may be a forceful contact even though the inserted conductor makes contact with the walls of the recess on only two sides and even though the cross-sectional area of the conductor is substantially smaller than the cross-sectional area of the recess. However, the arrangement illustrated in FIG. 7b, wherein the cross-sectional areas of the conductor and of the recess are substantially the same, will generally be preferred to such an arrangement because of the increased contact area. Therefore, with respect to cylindrical conductors such as used in the arrangement of FIG. 7a and also with respect to other arrangements wherein the recess in one of the conductors penetrates at least two surfaces of the conductor, it is desirable that the recess be so made or machined or situated that the portion of the male conductor or metal bar which fits within the recess is at least 50% surrounded by the female conductor or graphite article. In other words, the recess of FIG. 7a must surround at least one-half of the perimeter of the male conductor or steel bar used in the illustrated construction so as to insure that there will be sufficient graphite to be acted upon or "pressured-against" by the differential expansion of the steel bar within same.

The steel metal bars employed in the present invention typically have a coefficient of thermal expansion (CTE) of about $125 \times 10^{-7}$ inches/inch/° C. (or in./in./° C.) and the graphite employed typically has a transverse CTE (transverse to the direction of extrusion, if an extruded article, or perpendicular to the direction of molding, if a molded article) of about $25 \times 10^{-7}$ in./in./°C. Pre-baked or baked or amorphous carbon articles used in this invention will typically have a transverse CTE of about $36 \times 10^{-7}$ in./in./° C. These CTE values are the mean coefficients of thermal expansion measured over the temperature range of 20° C. to 100° C. By "transverse" CTE is also meant the CTE of the graphite or carbon article in either direction perpendicular to the metal bar, rather than longitudinally in the direction of same. (These directions are illustrated in FIG. 7a.) Usually the two tranverse CTE's of an extruded carbon product are about the same and the longitudinal CTE is different. If either of the transverse CTE's of the graphite is lower than about $25 \times 10^{-7}$ in./in./° C., then the predetermined clearance should generally be adjusted so as to be based on or controlled by this smaller CTE. The following table is set forth to show the manner in which clearance would typically be adjusted for 2½" and 4½" steel pins depending upon the limiting transverse CTE of the graphite or carbon article used.

TABLE

| Minimum CTE of the carbon or graphite in either transverse direction | Typical clearance to be used (in.) | |
|---|---|---|
| | 2½" pin | 4½" pin |
| $25 \times 10^{-7}$ in./in./° C | .025 | .040 |
| $12 \times 10^{-7}$ in./in./° C | .028 | .045 |
| $37 \times 10^{-7}$ in./in./° C | .022 | .034 |

It is apparent, of course, that the more the graphite or carbon expands, or the higher its CTE, the less is the clearance necessary to adjust for the thermal expansion of the steel without splitting. It should also be remembered that the foregoing designated clearances are indicated as "typical" for an assumed "use" temperature of about 950° C., and that if the intended "use" temperature is substantially below this then smaller clearances should be used because of the lesser differential expansion which takes place.

It should be appreciated that the size metal pin used commercially is frequently decided upon by deciding how much current per cross-sectional area of pin is to be carried. For example the total current into a whole cathode pot (of relatively small size) may be 60,000 amperes, carried by about fifty 2½″ pins (4.9 square inches cross-sectional area), or about 1200 amperes per pin, or about 245 amperes per cross-sectional square inch of pin. Typically the pins of the present invention, when used in aluminum cells, carry between about 225 and about 275 amperes of current into the cell per square inch cross-sectional area of steel collector bars used. This ratio of current to pin cross-sectional area is fairly closely fixed, regardless of the diameter of the pin used since it represents fairly closely, an economic and efficiency balance between such factors as electrical losses, current losses, thermal losses and material and installation costs. For example, the smaller the diameter of the pins used, the higher are the electrical losses and the installation and material costs, but the lower are the thermal losses; the larger the diameter of the pins used, the greater are the thermal losses. Cylindrical pins having diameters of from about 2 inches to about 6 inches or pins having cross-sectional areas ranging from about 3.14 square inches to about 28.26 square inches are considered most advantageous and commercially practical for aluminum cell operation. While these cross-sectional areas are for cylindrical pins of circular cross-section, it should be understood that they are also applicable to pins of other cross-sectional shapes such as have been previously discussed.

Although the invention described is mainly as applied to a connection between steel pins and graphite or carbon, and for use in an aluminum cell, the principle of the invention is more broadly novel than this, and may be used in many other environments than aluminum cells and with different materials than steel and graphite or carbon. The chief requirement of the electrical conductors which are used to make the connections of this invention is that they have different coefficients of thermal expansion. This means that connections between steel and graphite, or between steel and carbon, or between carbon and graphite, or even between graphite and graphite wherein the graphite materials possess different thermal expansion characteristics are all broadly embraced within the scope of the invention. It also means that steel to copper connections, or connections between titanium diboride and some other such material, etc., may also be operative and feasible if the materials used possess different CTE's. Neither is the invention limited to a connection made by heating the conductor materials; in other words, in some instances the conductor materials may be first assembled at one temperature and then used at another temperature below that at which they were assembled, in which case the principle of the present invention is still utilized but wherein the relative relationship of the expansion characteristics of the conductor materials is reversed.

Having thus described the nature of my invention and the uses for the product of my invention.

I claim:

1. An electrical connection between two electrical conductors having different coefficients of thermal expansion wherein the electrical connection will be subjected when in use to a temperature different than that at which it is assembled so as to cause a transverse differential expansion between the conductors, wherein the connection between the two conductors is made by longitudinally inserting a first conductor into an unthreaded recess in the second conductor into which recess an unthreaded portion of the first conductor fits with a predetermined clearance at assembly temperature, said predetermined clearance allowing for the differential transverse expansion between the inserted conductor and the second conductor as the temperature of the connection is changed to the temperature at which it will be used, said clearance also being small enough that as the temperature of the connection is changed from the assembly temperature to its use temperature the two conductors are brought into forceful contact with each other, but not so small that an appreciable rise in the electrical resistance of the connection at the use temperature occurs.

2. An electrical connection according to claim 1 wherein the unthreaded recess in the second conductor is in the form of a socket which extends inwardly from a single surface of the conductor.

3. An electrical connection according to claim 2 wherein said socket is cylindrical.

4. An electrical connection according to claim 1 wherein the unthreaded recess in the second conductor penetrates at least two of its surfaces and wherein the unthreaded portion of the first conductor which fits within the recess is at least 50% surrounded by the conductor with the recess.

5. An electrical connection according to claim 4 wherein the recess in the second conductor extends entirely through the conductor.

6. An electrical connection according to claim 4 wherein the recess in the second conductor extends from one side of the conductor and also cleaves a second surface of the conductor.

7. An electrical connection according to claim 6 wherein the recess which cleaves the second surface of the conductor extends entirely through the conductor.

8. An electrical connection between a metal bar and a carbon article having different transverse coefficients of thermal expansion wherein the electrical connection will be subjected to elevated temperatures when in use so as to cause a transverse differential expansion between the metal bar and the carbon article, wherein the metal bar is steel, and wherein the connection between the two is made by longitudinally inserting the metal bar into an unthreaded recess in the carbon article into which recess an unthreaded portion of the length of the steel bar fits with a predetermined clearance at room temperature, said predetermined clearance allowing for the differential transverse expansion between the inserted steel bar and the carbon article as the connection is heated from room temperature to the elevated temperature at which it will be used, said clearance also being small enough that as the temperature of the connection is changed from the assembly temperature to its use temperature the steel bar and carbon article are brought into forceful contact with each other, but not so small that the differential expansion will cause the carbon article to split at the said elevated temperature.

9. An electrical connection according to claim 8 wherein the elevated temperature to which the connection is subjected is between about 400° C. and about 1050° C.

10. An electrical connection according to claim 8 wherein the carbon article is graphite.

11. An electrical connection according to claim 10 wherein the steel metal bar has a CTE of about $$125. \times 10^{-7} \text{ in./in./}° \text{C.}$$

and wherein the graphite has a transverse CTE of about $25. \times 10^{-7}$ in./in./C., said CTE's being measured over the temperature range of 20° C. to 100° C.

12. An electrical connection according to claim 11 wherein the recess and steel bar are cylindrical and wherein the room temperature clearance is between about 0.6% and about 1.3% of the nominal diameter of the steel bar.

13. An electrical connection according to claim 8 wherein the unthreaded recess is in the form of a socket which extends inwardly from a single surface of the carbon article.

14. An electrical connection according to claim 13 wherein said socket is cylindrical.

15. An electrical connection according to claim 8 wherein the unthreaded recess penetrates at least two surfaces of the carbon article and wherein the unthreaded portion of the metal bar which fits within the recess is at least 50° surrounded by the carbon article.

16. An electrical connection according to claim 15 wherein the recess extends entirely through the carbon article.

17. An electrical connection according to claim 8 wherein the steel metal bar has a CTE of about $$125. \times 10^{-7} \text{ in./in./° C.}$$

and wherein the carbon has a transverse CTE of about $36. \times 10^{-7}$ in./in./° C., said CTE's being measured over the temperature range of 20° C. to 100° C.

18. An electrical connection according to claim 17 wherein the recess and steel metal bar are cylindrical, and wherein the room temperature clearance is between about 0.5% and about 1.2% of the nominal diameter of the steel bar.

19. An electrical connection according to claim 15 wherein the recess extends from one side of the carbon article and also cleaves a second surface of the carbon article.

20. An electrical connection according to claim 19 wherein the recess which cleaves the second surface of the carbon article extends entirely through the carbon article.

21. An electrical connection between a metal collector bar and the cathode of an aluminum cell having different transverse coefficients of thermal expansion, the improvement wherein the metal collector bar is steel and the cathode is baked carbon and wherein the connection between the two is made by longitudinally inserting the metal bar into an unthreaded recess in the baker carbon into which recess an unthreaded portion of the length of the steel collector bar fits with a predetermined clearance at room temperature, said predetermined clearance allowing for the differential transverse expansion between the inserted steel and the baked carbon as the aluminum cell is heated from room temperature to operating temperature, said clearance being small enough that as the temperature of the connection is changed from room temperature to the operating temperature the steel bar and baked carbon cathode are brought into forceful contact with each other, but not so small that the differential expansion will cause the baked carbon cathode to split at the said operating temperature.

22. An electrical connection between a metal collector bar and the cathode of an aluminum cell having different transverse coefficients of thermal expansion, the improvement wherein the metal collector bar is steel and the cathode is graphite and wherein the connection between the two is made by longitudinally inserting the metal bar into an unthreaded recess in the graphite into which recess an unthreaded portion of the length of the steel collector bar fits with a predetermined clearance at room temperature, said predetermined clearance allowing for the differential transverse expansion between the inserted steel and the graphite as the aluminum cell is heated from room temperature to operating temperature, said clearance being small enough that as the temperature of the connection is changed from room temperature to the operating temperature the steel bar and graphite cathode are brought into forceful contact with each other, but not so small that the differential expansion will cause the graphite cathode to split at the said operating temperature.

References Cited

UNITED STATES PATENTS

| | | | |
|---|---|---|---|
| 1,048,581 | 12/1912 | Redlich | 13—18 |
| 1,115,027 | 10/1914 | Seabury | 313—324 |
| 1,490,504 | 4/1924 | Boothman | 29—525 |
| 2,728,109 | 12/1955 | Bonnot | 18—54.7 |
| 3,088,762 | 5/1963 | Kaufmann et al. | |
| 3,244,610 | 4/1966 | Brown et al. | 204—279 |
| 3,313,976 | 4/1967 | Lauzau et al. | 313—354 |

MARVIN A. CHAMPION, Primary Examiner

JOSEPH H. McGLYNN, Assistant Examiner

U.S. Cl. X.R.

13—18; 29—525, 630; 174—94; 287—127

PO-1050
(5/69)

UNITED STATES PATENT OFFICE
CERTIFICATE OF CORRECTION

Patent No. 3,489,984      Dated January 13, 1970

Inventor(s) Bruce L. Bailey

It is certified that error appears in the above-identified patent and that said Letters Patent are hereby corrected as shown below:

Column 1, line 17, "between the two conductors. More particu-" should read---wherein the electrical connection will be sub- ---. (c.f. the specification and page 1 of 9/24/68 Amendment).

Column 3, line 62, "pentrating" should read---penetrating-- (c.f. the specification, page 7, line 10).

Column 4, line 22, the period at the end of the line should be a comma, (c.f. the specification, page 8, line 12).

Column 5, line 17, --also--should be inserted before "made", (c.f. the specification, page 10, line 19).

Column 5, line 29, "contracts" should read--contacts-- (c.f. the specification, page 11, line 4).

Column 9, line 37, "baker" should read--baked-- (c.f. line 7 of claim 21 of the amendment filed 9/24/68).

Signed and sealed this 7th day of July 1970.

(SEAL)
Attest:

EDWARD M. FLETCHER, JR.      WILLIAM E. SCHUYLER, JR.
Attesting Officer      Commissioner of Patents